June 24, 1930.  C. L. WILES  1,767,826
FEEDING DEVICE FOR RIM ROLLING MACHINES
Filed Jan. 31, 1928  2 Sheets-Sheet 1

INVENTOR.
CHARLES L. WILES.
BY
ATTORNEY.

June 24, 1930.    C. L. WILES    1,767,826

FEEDING DEVICE FOR RIM ROLLING MACHINES

Filed Jan. 31, 1928    2 Sheets-Sheet 2

INVENTOR.
CHARLES L. WILES.
BY
*John P. Jarboe*
ATTORNEY.

Patented June 24, 1930

1,767,826

UNITED STATES PATENT OFFICE

CHARLES L. WILES, OF DETROIT, MICHIGAN, ASSIGNOR TO BUDD WHEEL COMPANY, OF PHILADELPHIA, PENNSYLVANIA, A CORPORATION OF PENNSYLVANIA

FEEDING DEVICE FOR RIM-ROLLING MACHINES

Application filed January 31, 1928. Serial No. 250,851.

This invention relates to a feeding device for rim rolling machines of the type commonly used in the manufacture of automobile wheels to form or partially form the rim to proper cross section to receive a tire and tire retaining devices. As for example, these rims commonly must be shaped to form a fixed tire retaining flange on one edge, a cylindrical rim body and a gutter for a locking ring on the opposite edge whereby the removable tire retaining ring may be locked in place by the seating of the locking ring in the gutter. But my invention has other applications, as for example, in the loading of wheel fellies, and the annular bodies in general in any form of rims and fellies.

The object of the invention is to enable the rim rolling machines to be fed at a greater rate of speed, to operate continuously or so nearly continuously as practicable and to avoid inaccuracies and damage to either rim or forming machine incident to inaccurate feeding, and to prevent injury to the operators of such machines. Such machines very commonly comprise coacting rim forming rolls geared together to rotate in opposite directions in contact with the inner and outer faces of the rim, and have a relative axial movement of approach and separation whereby the rims to be formed may be radially inserted in proper relation to the separated rolls, may be engaged accurately by the approach roll, and removed freely from the again separated rolls. The idea is to have the machine operated continuously, going through its movements of approach and separation periodically under automatic control by cams or otherwise and to feed this machine reliably in the intervals of separation.

These objects are attained by pivotally mounting adjacent the axial plane of the coacting forming rolls and preferably parallel to that plane, a rim support arranged to support a rim in a plane which intersects the axis of pivotal support, arranged further in its swinging movement to carry the center of the support and correspondingly of the rim on an arc about the pivotal support which is tangent to the axial plane of the rim. Thus the device may be swung toward and from the rolls to carry the rim to the roll and to return to a position for reloading.

Still further, it comprises a rim support engaging the rim on opposite sides and the inner engagement of which is freed by the relative axial approach of the forming rolls. Additionally, the rim support is bipartite comprising an inner part having the aforesaid engagement with the inner edge in the lower part of the rim only, and an outer part engaging both lower and upper parts of the rim, the two parts being biased towards each other so that the rim having been fed to place, the outer parts may be removed to re-loading position while the inner part steadies the rim until free from engagement therewith by the relative axial movement, and it then returns to the coacting position of re-loading under its bias. The arrangement is such that while the coacting rolls engage a rim in a region at one end of the diameter, a rim support engages it principally in a region symmetrically disposed with respect to a diametrically opposed point on the same diameter, and there is thus no interference between coacting rolls and the support of the loading device.

Of the drawings which delineate a form of my invention now best known to me—

Figures 1, 4:
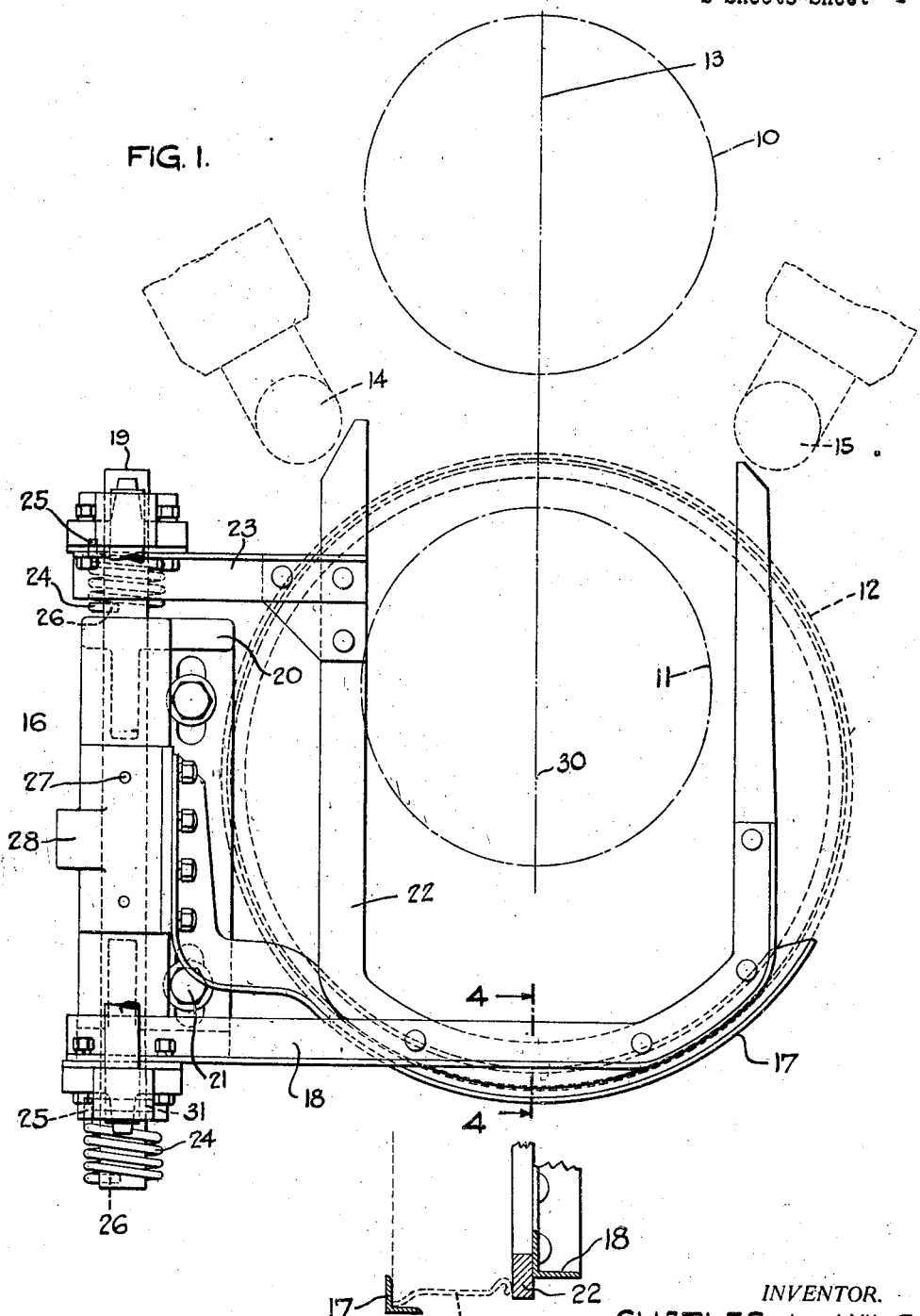
Figure 1 is a front elevation of the machine equipped with my invention.
Figure 4 is a cross section on line 4—4 of Fig. 1 showing the relations of the two parts of the feeding device.
Figure 2:
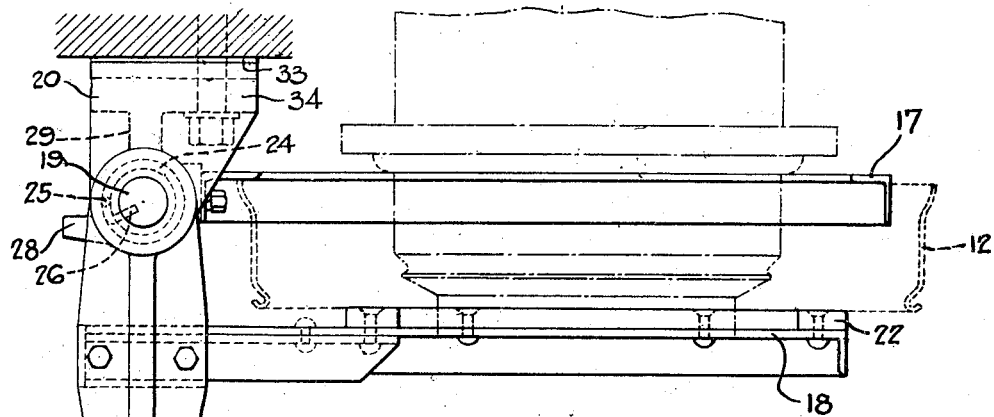
Figure 2 is a top plan view thereof.

10 and 11 are coacting forming rolls of the machines. They are diagramatically illustrated. As shown in dotted lines, they have a relative movement of approach and separation through the relative vertical movement of the lower roll whereby a rim as 12 placed over the lower roll is vertically raised into coaction with the upper roll 10. The axes of both rolls 10 and 11 lie in a common plane 13. Steadying rolls or guides 14 and 15 are disposed laterally of the main rolls to steady the rim being operated upon and to maintain its general circular form so nearly unimpaired as may be.

The feeding device is designated generally 16. It comprises a bipartite rim support composed of an inner supporting arm 17 and an outer supporting arm 18. These arms are commonly swingable about an axial shaft 19 carried by a bracket 20 bolted as indicated at 21 to any suitable part of the frame of the machine, (not shown). The inner part 17 of the support has an angle section extending upwardly and outwardly as shown in Figs. 1 and 4 and a longitudinal curvature corresponding to the curvature of the rim 12. It engages and supports the inner edge of the lower part of the rim as shown. The outer supporting arm 18 is also of angular section, but its engaging portion is in the form of a U shaped frame 22 of flat form engaging the outer edge of the rim in both its lower portion opposite the part 17 and the upper portion on opposite sides of the coacting rolls 10 and 11. The inner of the spaced arms of the U shaped frame 22 is additionally supported on the pivotal shaft 19 by means of an auxiliary arm 23.

Figure 3:
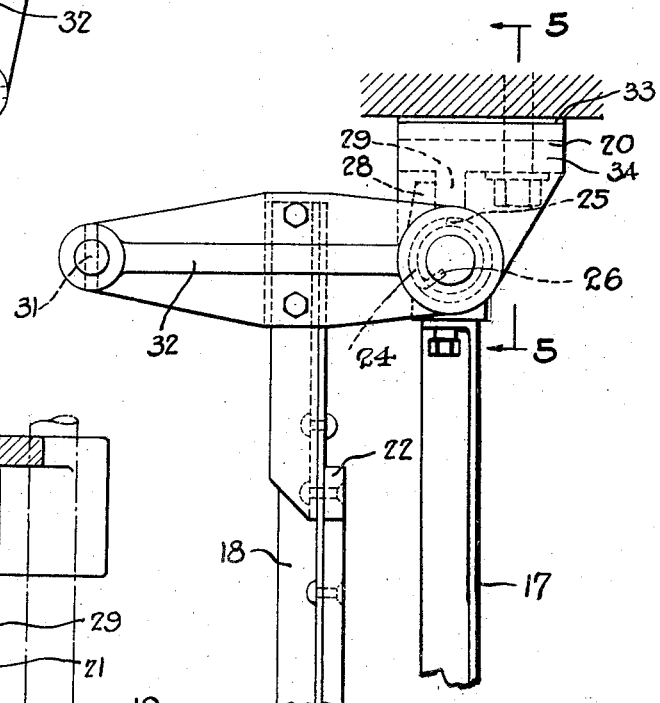
Figure 3 is a similar view showing the loading device in re-loading position.
Figure 5:
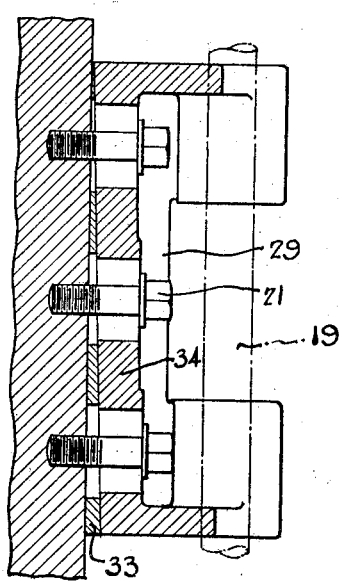
Figure 5 is a cross section on line 5—5 of Fig. 3 showing an adjusting device for the mechanism as a whole.

The two parts of the support 17 on the one hand and 18, 22, 23 on the other are forced towards each other by spiral springs 24, the ends of which are respectively connected at 25 with arms 32 to which the arms 18 and 23 are bolted, and at 26 with the pivotal shaft 19. Arm 17 is fixed to the shaft 19 by means of pins 27 whereas the arms 32 which carry arms 23 and 18 are freely rotatable on this shaft. Arm 17 is provided with a dog 28 arranged to engage the abutting wall 29 of the frame 20 and thereby, as shown in Fig. 3, to fix the re-loading position of the feeding device. A handle 31 interconnects the arms 32 which support the arms 18 and 23.

Geometrically speaking, the pivotal axis 19 is at one side of, but substantially parallel, to the axial plane of rolls 10 and 11. It is removed such a distance therefrom that the center 30, of the part 17 of the rim support and correspondingly of the rim being fed, as the feeding device is swung about the pivotal shaft 19, travels on an arc tangent to the plane 13 when the rim is fed into proper position between the rolls. In this position the coacting rolls engage the rim in a region at one end of the vertical diameter and the bipartite support engages it in a region symmetrically disposed with respect to the opposite end of the same diameter, and by the same token with respect to the axial plane 13. Still further, the part 17 of the support overlaps the inner edge of the wheel by but a small margin. Just as rolls 10 and 11 are approached the rim 12 is raised as shown in dotted lines in Fig. 4 and the part 17 is thereby freed from engagement therewith.

So organized, the operation is almost self-apparent. The arms 17 and 18 being in the extended positions respectively shown by dotted and full lines in Fig. 3, a rim is placed upon the part 17 with its outer edge engaged with the frame 22 of the part 18. The handle 31 interconnecting extensions 32 from arm 18 is then grasped and the entire rim support swung about the pivotal axis 19 to place the rim in the position shown in Fig. 1 with its upper edge overlying the lower one 11 of the two forming rolls. This takes place while the rolls are separated. The subsequent approach of rolls 10 and 11 raises the rim 12 so fed into coacting relationship with the roll 10, rolls 10 and 11 engaging the rim to be formed on the outside and inside, respectively. This approach movement frees or partially frees the parts 17 of the rim support from its overlapping engagement. After the rolling operation, the operator grasps the handle 31 and swings the arm 18 to the position shown in Fig. 3 to be re-loaded. The part 17 under the force of springs 24 is carried along with it if entirely freed from the rim, but follows after a small interval if not entirely free, whereupon the inner rim is placed on the support and the feeding operation repeated after the ensuing separation of rolls 10 and 11 and the removal of the completed rim. The springs 24 also serve to firmly hold the rim to be fed in alignment against the frame 22. Suitable stops (not shown) which may be adjustable or non-adjustable may be provided between the arms 17 and 18 to fix the spacing therebetween if desired. This spacing is equal to the distance between the plane of arm 18 as mounted at distances from pivotal shaft 19 on extension 32, and the pivotal shaft 19, or more exactly speaking, between the plane of the inner face of frame 22 and the plane of the inner branch of the angle section of arm 17. Arm 18 may be made adjustable on extension 32 if desired.

The feeding mechanism as a whole is adjustable toward and from the midplane of the working face of the forming rolls independently of the feeding movement by virtue of a wedge 33 interposed between the base 34 and the frame of the machine.

Each and all those modifications of my invention which fall within its generic spirit are intended to be covered in the annexed claims.

What I claim as new and useful is:

1. A rim rolling machine comprising coacting rolls and a rim feeding device for feeding rims to the rolls with their axes substantially parallel to the roll axes comprising a bipartite rim support, and means for forcing the parts of the support toward each other to engage the rim on opposite sides to hold it in place.

2. A rim rolling machine comprising coacting rolls and a rim feeding device comprising a bipartite rim support, means for forcing the parts of the rim support toward each other to engage the rim on opposite sides to hold it in place, the support being open on the side toward the part engaged by the rolls, whereby the rim is freed from engagement therewith through relative axial approach of the coacting rolls.

3. A rim rolling machine comprising coacting rolls and a bipartite feeding device for rims having an inner part engaging the rim on the lower edge only and an outer part engaging the rim on both the lower and upper edges.

4. A rim rolling machine comprising coacting rolls and a bipartite feeding device for rims having an inner part engaging the rim on the lower edge only and an outer part engaging the rim on both the lower and upper edges, means for relatively moving and forcing the inner and outer parts towards each other to hold the rim in place, the inner part being free for movement under the force exerted by said means after relative radial movement of the coacting rolls.

5. A feeding device for rim rolling machines comprising a swinging support for rims the axis of support of which lies in a plane cutting the axis of the supported rim at substantially right angles, and comprising inner and outer supporting arms relatively movable and forced towards each other to hold a rim.

6. A machine of the character described, a forming roll having the mid plane of its working face arranged in a determinate plane, a feeding device having a feeding movement toward and from said plane and means for adjusting said feeding device independent of the feeding movement toward and from said mid plane.

In testimony whereof he hereunto affixes his signature.

CHARLES L. WILES.